(12) United States Patent
Kay et al.

(10) Patent No.: US 11,352,076 B2
(45) Date of Patent: Jun. 7, 2022

(54) AIRFLOW DEFLECTION SYSTEM

(71) Applicant: McLaren Automotive Limited, Woking (GB)

(72) Inventors: Andrew Kay, Surrey (GB); Steven Digby Nicol, Buckinghamshire (GB); Scott Michael Shepherd, Newcastle upon Tyne (GB)

(73) Assignee: McLaren Automotive Limited, Surrey (GB)

( * ) Notice: Subject to any disclaimer, the term of this patent is extended or adjusted under 35 U.S.C. 154(b) by 7 days.

(21) Appl. No.: 16/994,155

(22) Filed: Aug. 14, 2020

(65) Prior Publication Data

US 2021/0046980 A1 Feb. 18, 2021

(30) Foreign Application Priority Data

Aug. 15, 2019 (GB) .................................... 1911683
Nov. 11, 2019 (GB) .................................... 1916386

(51) Int. Cl.
| | |
|---|---|
| *B62D 35/00* | (2006.01) |
| *B60J 1/20* | (2006.01) |
| *B60J 9/04* | (2006.01) |
| *B60J 1/02* | (2006.01) |

(52) U.S. Cl.
CPC .............. *B62D 35/005* (2013.01); *B60J 1/02* (2013.01); *B60J 1/2005* (2013.01); *B60J 9/04* (2013.01)

(58) Field of Classification Search
CPC ....... B62D 35/005; B60J 1/008; B60J 1/2005; B60J 1/02; B60J 9/04
See application file for complete search history.

(56) References Cited

U.S. PATENT DOCUMENTS

| 1,334,811 A | * | 3/1920 | Smith | .................... B60J 1/2005 |
| | | | | 180/68.4 |
| 2,187,281 A | | 1/1940 | Pagliaroni | |

(Continued)

FOREIGN PATENT DOCUMENTS

| CN | 104494711 | 4/2015 | |
| DE | 4418913 A1 * | 12/1995 | ................ B60J 1/20 |

(Continued)

OTHER PUBLICATIONS

EP Application No. 20191218.5, "European Search Report dated Jan. 21, 2021", 7 pages.

(Continued)

*Primary Examiner* — Gregory A Blankenship
(74) *Attorney, Agent, or Firm* — Kilpatrick Townsend & Stockton LLP

(57) ABSTRACT

A vehicle comprising: a passenger compartment; a nose region forwards of the passenger compartment, the nose region having a top surface and a front; and a duct running from an inlet to an outlet to permit air flowing into the inlet to be channeled to the outlet, the inlet being positioned at the front of the nose region below the top surface and the outlet being positioned on the top surface of the nose region behind the inlet, the outlet being oriented so that air flowing through the outlet is directed in an upwards direction, the upwards airflow causing disruption to a rearward airflow moving towards the passenger compartment.

20 Claims, 9 Drawing Sheets

(56) References Cited

U.S. PATENT DOCUMENTS

| | | | | |
|---|---|---|---|---|
| 3,214,215 | A * | 10/1965 | Hansen | B60J 1/2005 296/91 |
| 3,516,707 | A * | 6/1970 | Wilfert | B62D 35/00 296/91 |
| 3,574,392 | A * | 4/1971 | Hirano | B60J 1/2005 296/91 |
| 3,616,871 | A * | 11/1971 | West | B60J 1/2005 180/68.1 |
| 3,647,256 | A * | 3/1972 | Cox | B60J 1/2005 296/91 |
| 4,040,656 | A * | 8/1977 | Clenet | B60J 1/2005 296/91 |
| 4,379,582 | A * | 4/1983 | Miwa | B62D 35/005 296/180.5 |
| 5,184,832 | A * | 2/1993 | Miwa | B62D 35/005 296/198 |
| 5,486,139 | A | 1/1996 | Papp | |
| 5,630,640 | A * | 5/1997 | Fior | B60J 7/22 296/91 |
| 6,447,049 | B1 * | 9/2002 | Tohda | B60R 19/12 296/180.1 |
| 6,926,346 | B1 * | 8/2005 | Wong | B62D 35/001 296/180.5 |
| 7,722,108 | B2 * | 5/2010 | Ueda | B62J 17/04 296/78.1 |
| 9,399,493 | B1 * | 7/2016 | Milde, Jr. | B62D 35/005 |
| 10,518,815 | B2 * | 12/2019 | Del Gaizo | B62D 25/10 |
| 10,843,533 | B2 * | 11/2020 | Biancalana | B60J 1/02 |
| 2004/0026954 | A1 * | 2/2004 | Neel | B62D 35/005 296/95.1 |
| 2012/0292122 | A1 | 11/2012 | Verbrugge | |
| 2015/0321547 | A1 * | 11/2015 | Pickl | B62D 37/02 180/68.1 |
| 2016/0272257 | A1 * | 9/2016 | McKillen | B60K 11/08 |
| 2017/0297450 | A1 | 10/2017 | Nagaosa | |
| 2017/0349040 | A1 | 12/2017 | Nagaosa | |
| 2018/0229780 | A1 * | 8/2018 | Thompson | B62D 37/02 |
| 2019/0176908 | A1 * | 6/2019 | Slight | B62D 35/005 |
| 2019/0233022 | A1 * | 8/2019 | Biancalana | B62D 35/005 |
| 2021/0046980 | A1 * | 2/2021 | Kay | B60J 1/02 |

FOREIGN PATENT DOCUMENTS

| | | | |
|---|---|---|---|
| DE | 102006007657 | 8/2007 | |
| DE | 102013002217 | 3/2014 | |
| EP | 3517414 | 7/2019 | |
| GB | 830321 | * 3/1960 | ............... B60J 1/02 |

OTHER PUBLICATIONS

GB Application No. GB1911683.9 Search Report Under Section 17(5) dated Feb. 10, 2020, 4 pages.

* cited by examiner

AIRFLOW DEFLECTION SYSTEM

This application claims priority to GB Patent Application No. 1916386.4, filed Nov. 11, 2019, titled "Airflow Deflection System" and to GB Patent Application No. 1911683.9, filed Aug. 15, 2019, titled "Airflow Deflection Systems," the entirety of both of which are hereby incorporated by reference for all purposes.

This invention relates to a vehicle comprising a duct causing a redirection of an airflow moving towards a passenger compartment.

There are some cars that are not fitted with a roof. These cars may be permanently roofless or temporarily roofless. For instance, many racing cars do not have a roof at all whereas some sports cars have a retractable roof. These vehicles can offer an improved driving experience because the passenger compartment is open to the sky. Many of these vehicles still have a front windscreen, especially those cars that are sports cars rather than race cars, because otherwise the occupants tend to be bombarded with an oncoming rearwardly moving airflow when the car is in motion. This airflow can also include foreign objects such as stones or insects. It is undesirable for these to strike the occupants of the passenger compartment.

If the front windscreen is removed, then it is common for the occupants of the vehicle to wear helmets to protect themselves from the rearwardly moving airflow and any flying objects it contains. However, in situations where a car is not being driven in a race situation is it undesirable for the occupants to need to always wear helmets. For instance, if the car is a sports car then whilst the car may be driven enthusiastically at times during other periods the car may be driven more sedately. In these situations, it would be desirable for the occupants to be able to drive the car without needing to wear helmets.

U.S. Pat. No. 5,630,640 proposes a deflecting device to assist in redirecting a rearwardly moving airflow over a passenger compartment. This is positioned where a windscreen would normally be positioned. However, such a device is not effective above certain speeds where the device then struggles to redirect enough airflow to effectively disrupt the airflow moving towards the passenger compartment.

Therefore, it would be desirable to have a vehicle with an improved system for redirecting a rearward airflow moving towards a passenger compartment.

According to a first aspect of the present invention there is provided a vehicle comprising: a passenger compartment; a nose region forwards of the passenger compartment, the nose region having a top surface and a front; and a duct running from an inlet to an outlet to permit air flowing into the inlet to be channeled to the outlet, the inlet being positioned at the front of the nose region below the top surface and the outlet being positioned on the top surface of the nose region behind the inlet, the outlet being oriented so that air flowing through the outlet is directed in an upwards direction, the upwards airflow causing disruption to a rearward airflow moving towards the passenger compartment.

The inlet may be positioned behind a leading edge of the front of the nose region. The nose region may have an underside and the inlet may be positioned at the underside of the nose region. The inlet may be oriented to channel a rearwardly moving airflow into the duct. The outlet may be oriented so that air flowing through the outlet is directed away from the passenger compartment. The outlet may be arcuate in shape running across the nose region.

The outlet may comprise a first set of vanes running widthways across the outlet. The first set of vanes may be spaced from each other along the length of the outlet. The first set of vanes may be oriented to spread the upwards airflow in a lateral direction of the vehicle.

The outlet may comprise a second set of vanes running lengthways across the outlet. The second set of vanes may comprise a single vane located centrally along the width of the outlet. The second set of vanes may be spaced from each other along the length of the outlet. The second set of vanes may be oriented to direct air flowing through the outlet in an upwards direction and away from the passenger compartment.

The duct may comprise a restriction moveable from a first position in which airflow through the duct is substantially unimpeded to a second position in which airflow through the duct is substantially impeded. The restriction may comprise a flap. The restriction may comprise a valve.

The vehicle may comprise an airflow deflector positioned forward of the outlet, the airflow deflector may project from the top surface of the nose region to direct a rearwardly moving airflow over the top surface of the nose region in an upwards direction to cause disruption to the rearward airflow moving towards the passenger compartment. The airflow deflector may be moveable between a lowered configuration and a raised configuration, the airflow deflector may project minimally from the top surface of the nose region when in the lowered configuration and the airflow deflector may project maximally from the top surface of the nose region when in the raised configuration. The airflow deflector may be housed completely within the nose region when in the lowered configuration. The airflow deflector may comprise a transparent panel. The vehicle may comprise a control unit configured to cause the restriction to move to the first position and the airflow deflector to move to the raised position in response to a control signal indicating that airflow disruption for the passenger compartment is required. The vehicle may comprise a control unit configured to cause the restriction to move to the second position and the airflow deflector to move to the lowered position in response to a control signal indicating that airflow disruption for the passenger compartment is not required.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising a passenger compartment and a nose region forwards of the passenger compartment, the nose region having a top surface and a front. The vehicle further comprises a duct running from an inlet to an outlet to permit air flowing into the inlet to be channeled to the outlet, the inlet being positioned at the front of the nose region below the top surface and the outlet being positioned on the top surface of the nose region behind the inlet, the outlet being oriented so that air flowing through the outlet is directed in an upwards direction, the upwards airflow causing disruption to a rearward airflow moving towards the passenger compartment. The vertical airflow exiting the outlet causes rearward airflow that did not enter the inlet and flowed over the surface of the vehicle body to be directed upwards away from the passenger compartment. The passenger compartment may be roofless. The passenger compartment may have no front windscreen.

Figure 1:
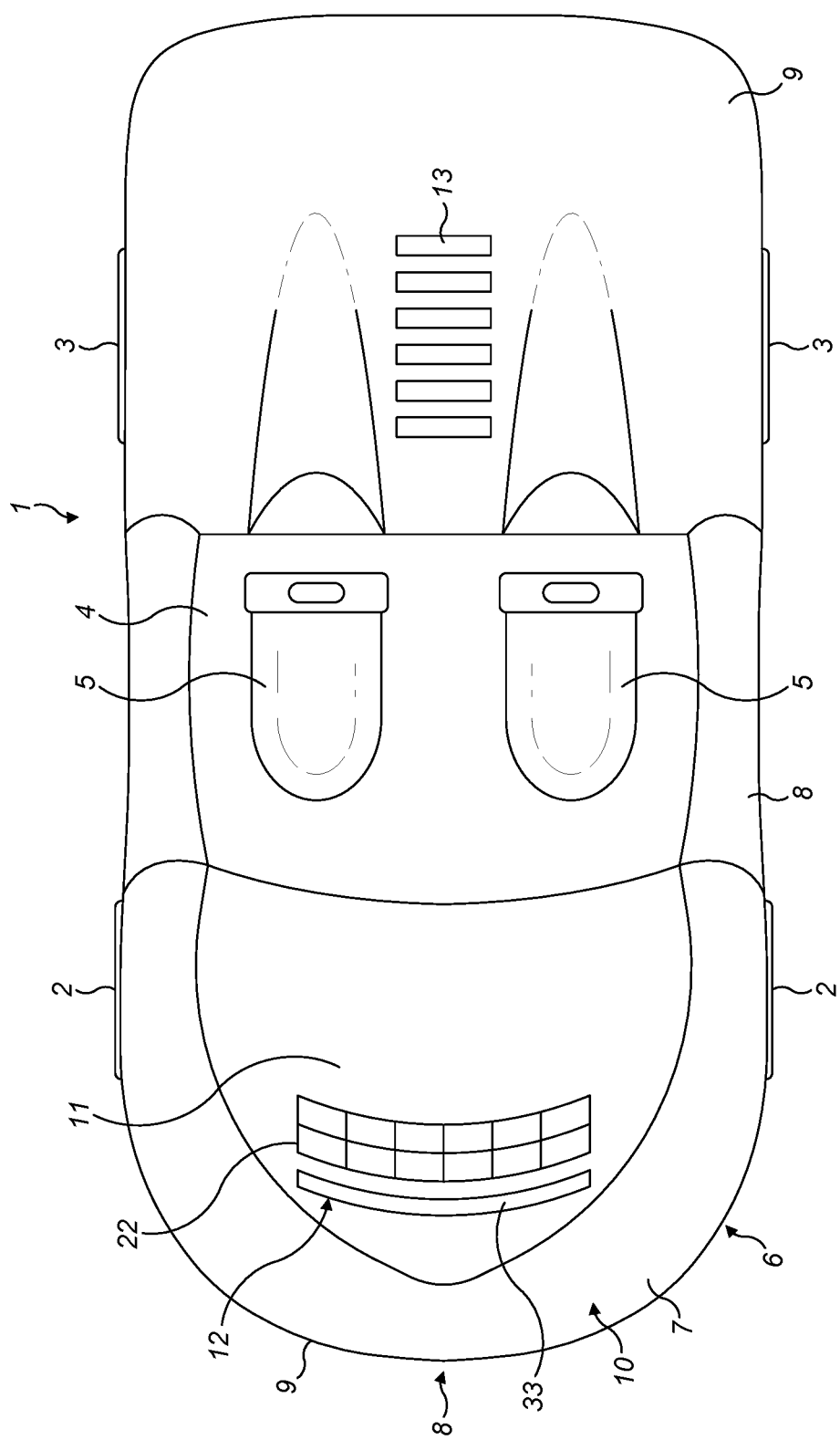
FIG. 1 shows a schematic plan view of a vehicle.

FIG. 1 shows a vehicle 1. The vehicle 1 may be an automobile. The vehicle 1 may be a car. The vehicle 1 pictured in FIG. 1 is a roofless vehicle. The vehicle 1 comprises front wheels 2 and rear wheels 3. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats 5 for occupants of the vehicle to sit in. The occupant compartment 4 may accommodate a driver. The occupant compartment may accommodate one or more passengers. The vehicle 1 may comprise controls located within the occupant compartment 4 to enable an occupant to control the motion of the vehicle. The occupant compartment 4 may also be known as a passenger compartment.

The vehicle comprises a vehicle body 6. The vehicle body 6 comprises a plurality of body panels. For example, the body panels may include bonnet panel(s) 7, side door panel(s) 8, and rear deck panel(s) 9. The vehicle body 5 have an outer surface made up of the outer surface of the body panels. The outer surface of the vehicle body defines the exterior surface of the vehicle 1.

The vehicle 1 comprises a nose region 8. The nose region 8 is located forwards of the passenger compartment 4. The front wheels 2 may be located in the nose region of the vehicle 1. The nose region 8 extends across the whole of the lateral width of the vehicle 1. The nose region 8 extends from a leading edge 9 of the nose region to the front of the passenger compartment. The leading edge 9 of the nose region is the forward facing front edge of the nose region. The nose region 8 has a front 10 which is the area of the nose region near the leading edge of the nose region 8. The nose region 8 also has a top surface 11. This is the top surface 11 of the nose region 8 exposed to the top of the vehicle. When the vehicle 1 is in forward motion, a rearwardly moving airflow passes over the top surface 11 of the nose region towards the occupant compartment 4.

The vehicle 1 also comprises an airflow redirection device shown generally at 12 in FIG. 1. The airflow redirection device 12 is mostly housed within the vehicle body 6 and so the majority of the device 12 cannot be seen in FIG. 1. FIGS. 2 to 6 show the airflow redirection device 12 in more detail.

Figure 2:
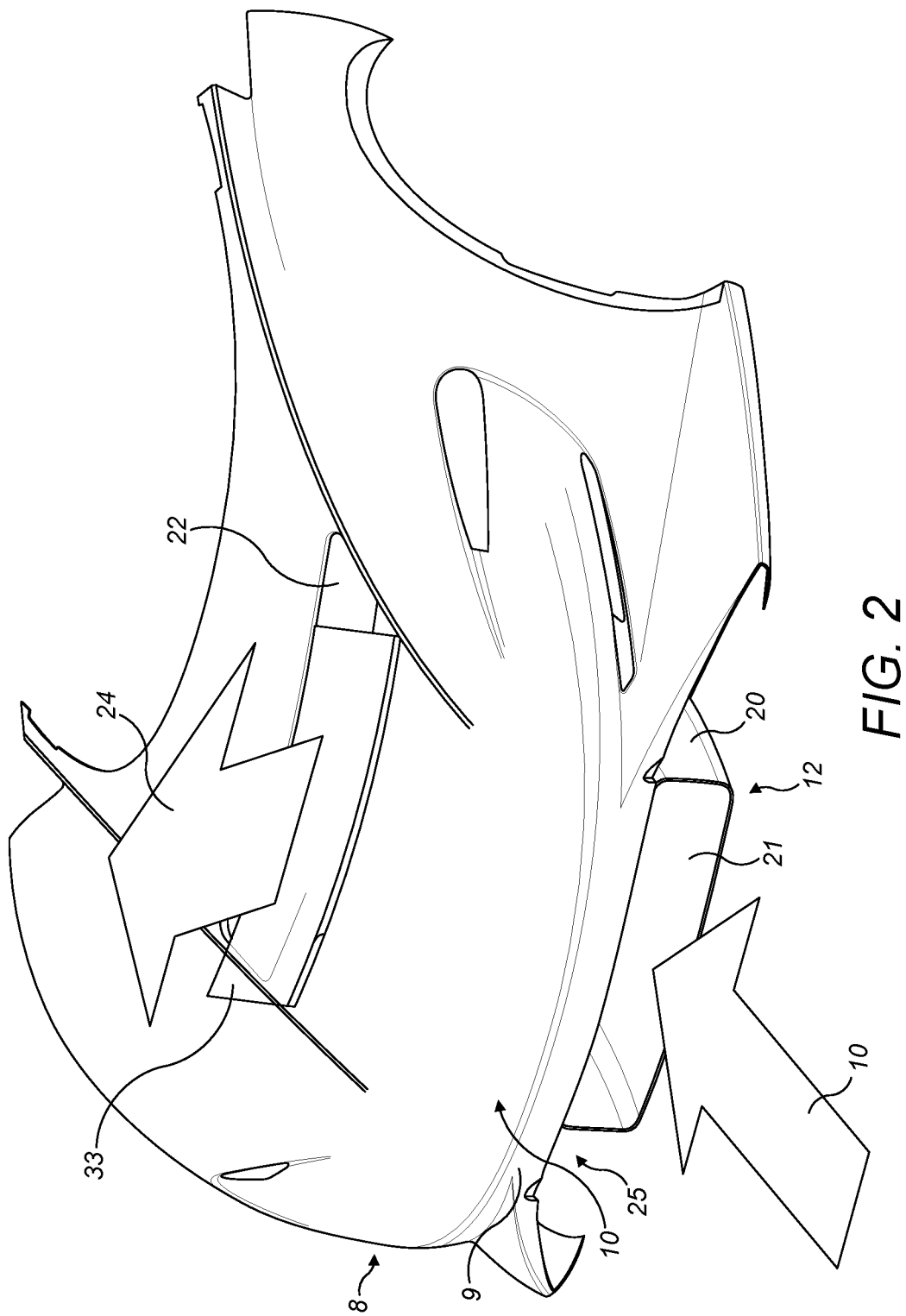
FIG. 2 shows a schematic three-quarters view of a nose region of the vehicle.

FIG. 2 shows a three quarters view of the nose region 8. The vehicle 1 comprises a duct 20 that runs from an inlet 21 to an outlet 22. The duct 20 permits air flowing into the inlet 21, shown by arrow 23, to be channeled to the outlet 22. The air flows out of outlet 22, as shown by arrow 24. The duct 20 runs through the vehicle body.

The nose region 8 has an underside 25. The underside 25 is located opposite to the top surface 11 of the nose region 8. The inlet 21 is positioned at the front 10 of the nose region 8. The inlet 21 is positioned towards the underside of the vehicle 1. As in, the inlet 21 is positioned between the underside 25 of the nose region 8 and the running surface of the vehicle 1 on which the wheels 2, 3 sit. In this way, the inlet 21 is positioned below the top surface 11 of the nose region 8 at the front 10 of the nose region 8. The inlet 21 is positioned below the leading edge 9 of the nose region 8. The inlet 21 is positioned behind the leading edge 9 of the nose region 8.

When the vehicle 1 is in forward motion, a rearwardly moving airflow is incident on the vehicle 1. Some of this rearwardly moving airflow will be directed into the duct 20 by the inlet 21. The inlet 21 runs across the front of the vehicle 1. The inlet 21 has a length that runs across the vehicle 1 in the lateral direction of the vehicle 1. The inlet 21 has a width that runs along a generally vertical direction. The inlet 21 has a length that is greater than its width. The length of the inlet 21 is at least three times the width of the inlet 21. By positioning the inlet 21 at the front and to the underside of the nose region 8, the inlet 21 can run across a substantial portion of the front of the vehicle 1 without being visually intrusive. This means that it can collect more airflow than would be possible if it was located, for example, on the top surface 11 of the nose region 10. In addition, it collects air that has started to be forced underneath the vehicle 1, this means that the air is at higher pressure meaning the mass of air directed into the duct 20 is greater than might be the case if the inlet 21 was located on the top surface 11 of the nose region 10. The low position of inlet 21 also means that there is more vertical space for the duct 20 which will be shown to be advantageous when discussing outlet 22.

The outlet 22 is positioned on the top surface 11 of the nose region 10. The outlet 22 is positioned in front of the occupant compartment 4. The outlet 22 has a length that runs across the vehicle 1 in the lateral direction of the vehicle 1. The outlet 22 has a width that runs along the longitudinal direction of the vehicle 1. The outlet 22 has a length that is greater than its width. The length of the outlet 22 is at least three times the width of the outlet 22.

As shown in FIGS. 1 and 2, the outlet 22 may be positioned closer to the leading edge 9 of the nose region 10 than to the occupant compartment 4. The outlet 22 is positioned to the rear of inlet 21. The air flows through the duct 20 from the inlet 21 to the outlet 22. The outlet 22 is oriented so that air flowing through and out of the outlet 22 is directed in an upwards direction as shown by arrow 24. The airflow exiting the outlet 22 causes rearward airflow, generated by forward motion of the vehicle, that did not enter the inlet 21 and instead flowed over the top surface 11 of the nose region 10 towards the occupant compartment 4 to be directed upwards away from the occupant compartment 4. The upwards airflow exiting the outlet 22 acts on the rearwardly moving airflow moving over the top of the vehicle 1 to push that airflow upwards away from the occupant compartment. In this way, it can cause a disruption to the rearward airflow moving towards the passenger compartment 4. The rearward airflow moving across the top of the vehicle is deflected upwards away from the passenger compartment 4.

The outlet 22 may be oriented so that the air flowing through and out of the outlet 22 is directed in a generally vertical direction. However, it has been identified that a greater deflection of the rearward airflow can be achieved if the outlet 22 is oriented so that the air flowing out of the outlet 22 is directed in a forward direction as well as in an upward direction. Thus, advantageously the outlet is oriented so that air flowing through the outlet is directed away from the passenger compartment. The outlet may be oriented so that the air flowing through the outlet is directed at approximately a 45-degree angle towards the front of the vehicle. Thus, the air is directed in both an upwards and forwards direction in equal magnitude. The outlet may be oriented so that the air flowing through the outlet is directed at approximately a 5, 10, 15, 20, 25, 30, 35 or 40-degree angle towards the front of the vehicle. The angles may be measured from vertical.

Figure 3A:
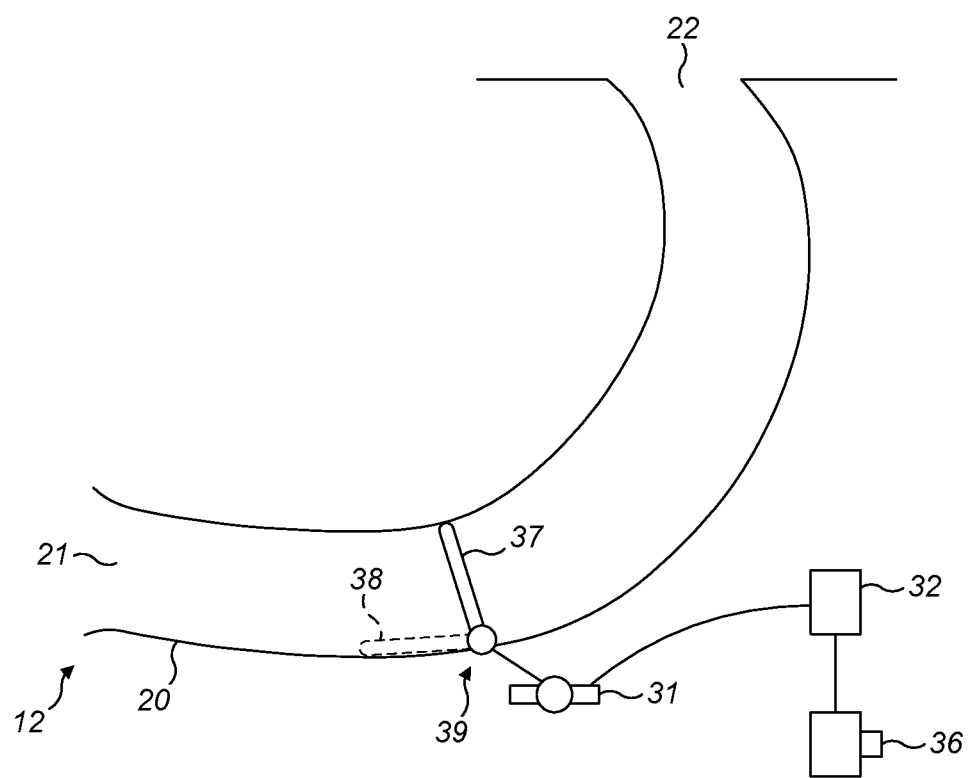
FIG. 3A shows a schematic cut through view of the airflow redirection device.
Figure 3B:
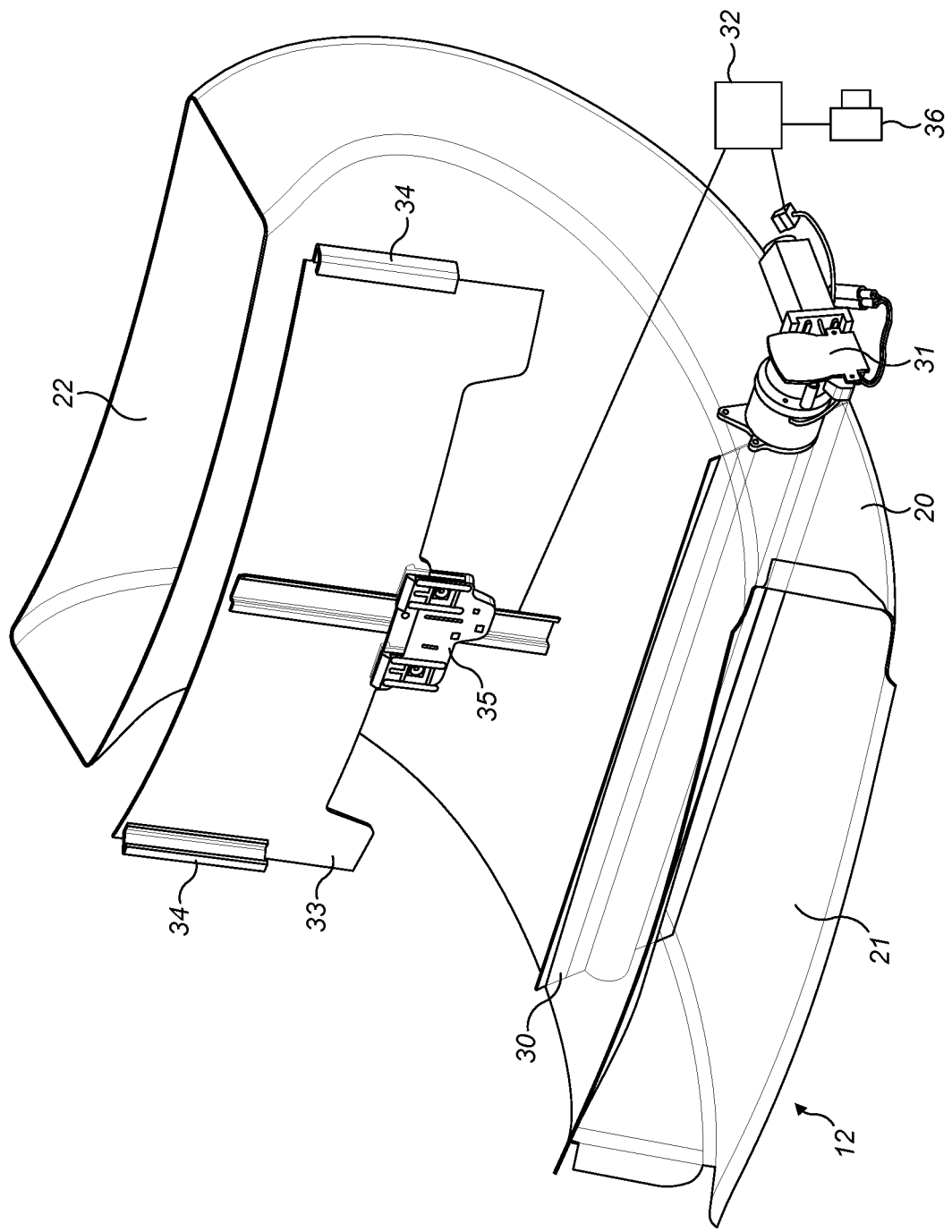
FIG. 3B shows a schematic three-quarters view of an airflow redirection device and an airflow deflector.
Figure 4:
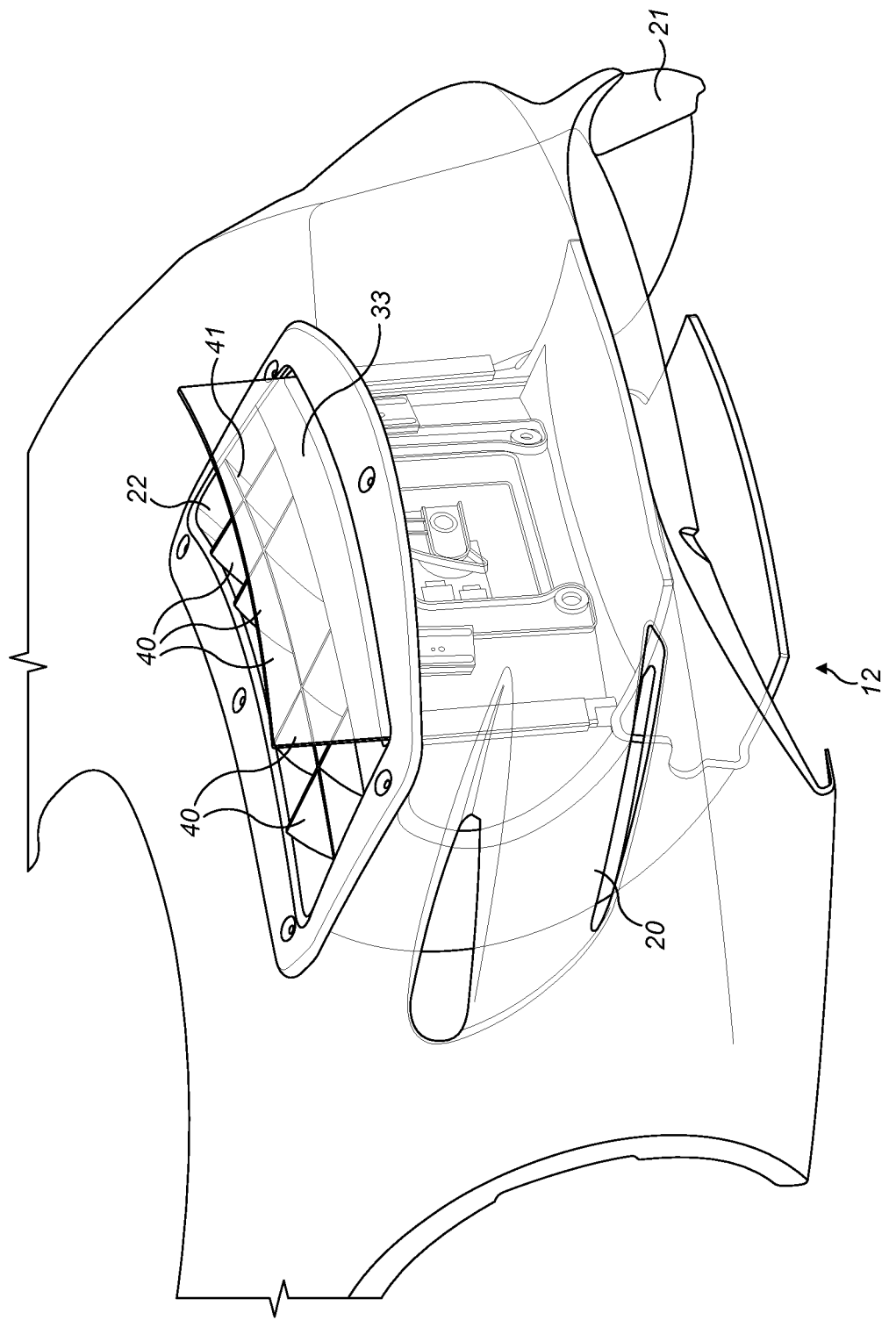
FIG. 4 shows a schematic three-quarters view of the airflow redirection device and the airflow deflector together with the nose region of the vehicle.
Figure 5:
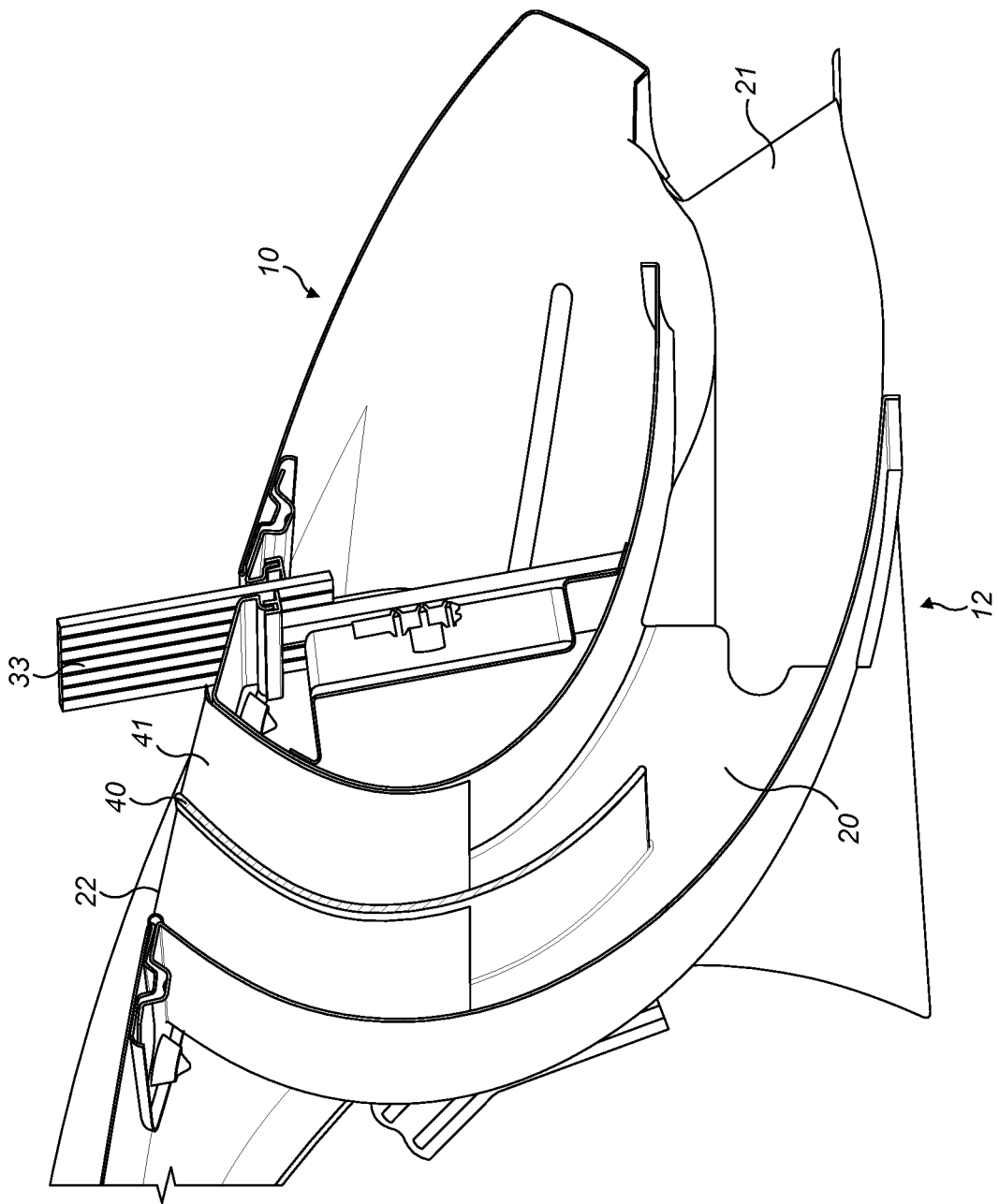
FIG. 5 shows a schematic side cut through view of the airflow redirection device and the airflow deflector together with the nose region of the vehicle.

The shape of duct 20 is shown more clearly in FIGS. 3 to 5. FIG. 3B shows a three-quarters view of the main parts of the airflow redirection device 12 without the rest of the vehicle 1. The duct 20 is shaped to redirect the air flowing into the inlet 21 to the orientation of the outlet 22. The duct 20 is curved along its length to change the direction of the airflow from the orientation of the inlet 21 to the orientation of the outlet 22. The duct 20 may have a decreasing radius of curvature as it runs from the inlet 21 to the outlet 22. This serves to accelerate the change in direction of the airflow as it approaches the outlet 22. The low position of the inlet 21 means that there is more room for the duct 20 to change direction of the airflow compared to having the inlet 21 on the top surface 11 of the nose region 10. The duct 20 may be arcuate along the direction that runs across the vehicle 1. The duct 20 may be arcuate towards the end of the duct 20 near the outlet 22 and generally straight-sided towards the end of the duct 20 near the inlet 21.

The duct 20 may comprise a variable restriction 30. The restriction 30 is moveable between a first position in which airflow through the duct 20 is substantially unimpeded and a second position in which airflow through the duct 20 is substantially impeded. The restriction 30 may seal against the walls of the duct 20 when in the second position to stop air flowing past the restriction 30. It will be appreciated that if the restriction 30 remains in the duct when in the first position then it may have an effect of the airflow through the duct but that this effect should be at a minimum when the restriction 30 is in the first position.

The restriction 30 may comprise a flap 39 as shown in FIG. 3A. The flap 39 is attached to one surface of the interior of the duct and is caused to extend across the duct 22 when in the second position 37 and be substantially aligned with the surface that the flap 39 is attached to when in the first position 38.

The restriction 30 may comprise a valve as shown in FIG. 3B. The valve rotates to move between the first and second positions. In the first position, the valve is positioned generally in line with the flow of air through the duct 20 so cause minimum disruption to air flowing through the duct 20. In the second position, the valve extends across the duct 20 to substantially seal the duct 20 to air flowing through the duct 20.

The restriction 30 may be moved by an actuator 31. The actuator 31 may be any suitable device for causing movement to the restriction 30. The actuator 31 may be an electric motor as shown in FIGS. 3A and 3B. The actuator 31 is connected to a control unit 32. The control unit 32 provides control signals to the actuator 31 to control the movement of the restriction 30 between the two positions. The control unit 32 may be a discrete device or may be part of a more general vehicle control unit.

The airflow redirection device 12 may comprise some or all of the duct 20, inlet 21, outlet 22 and associated components.

The vehicle 1 as pictured in FIGS. 1 to 5 also comprises an airflow deflector 33. The airflow deflector 33 has been removed from FIG. 3A for clarity but it will be understood that the airflow deflector 33 can be used with the airflow redirection device 12 shown in FIG. 3A. The airflow deflector 33 is positioned between the leading edge 9 of the nose region 10 and the outlet 22. In this way, the airflow deflector 33 is positioned forward of the outlet 22. The airflow deflector 33 projects from the top surface 11 of the nose region 10. The airflow deflector 33 projects in a generally upward direction. The airflow defector 33 as shown in the figures is also slanted slightly towards the occupant compartment 4. The airflow deflector 33 projects from the top surface 11 of the nose region 10 to direct a rearwardly moving airflow over the top surface 11 of the nose region 10 in an upwards direction. Thus, the rearward slant on the airflow deflector 33 assists in directing the airflow in an upwards direction rather than just causing a general disruption to that airflow. The airflow deflector 33 serves to assist in the disruption to the rearward airflow that would otherwise be moving towards the passenger compartment. The airflow deflector 33 runs across the vehicle in the lateral direction of the vehicle. The airflow deflector 33 has a length that runs across the lateral direction of the vehicle 1. The airflow deflector 33 has a width that runs along a generally vertical direction. The airflow deflector 33 has a length that is greater than its width.

The airflow deflector 33 is moveable between a lowered configuration where the airflow deflector 33 projects minimally from the top surface 11 of the nose region 10 and a raised configuration where the airflow deflector 33 projects maximally from the top surface 11 of the nose region 10. The lowered configuration is shown generally in FIG. 3B. The raised configuration is shown generally in FIGS. 2, 4 and 5. When the airflow deflector 33 is in the lowered configuration it may be housed completely within the nose region. Therefore, the airflow deflector 33 may not project from the top surface when in the lowered configuration. FIG. 4 shows a three quarters view of the airflow redirection device in-situ with a schematic representation of the nose region 10 of the vehicle 1. FIG. 5 shows a cut through view of the airflow redirection device in-situ with a schematic representation of the nose region 10 of the vehicle 1. In FIG. 4, part of the inlet 21 have been removed for clarity. In FIGS. 4 and 5, the restriction 30 and actuator 31 have been removed for clarity.

The airflow deflector 33 may be translucent. This is advantageous because when the airflow deflector 33 projects from the nose region 10 it may be in the eye line of the driver and obstruct the driver seeing the nose of the vehicle. Therefore, this means that the driver can still see the nose of the vehicle even when the airflow deflector is in the raised configuration. Alternatively, the airflow deflector 33 may be non-transparent. This may be advantageous because a non-transparent panel may be capable of being made stronger than a transparent panel due to there not being such a restriction on the type of material used and/or the thickness of the panel. This may be improve the ability of the airflow deflector 33 to change the path of the airflow because it is less likely to change shape when airflow is incident on it.

The airflow deflector 33 may be supported by runners 34. There may be one runner to each side of the air flow deflector which permit the airflow deflector 33 to move between the raised and lowered configurations. The airflow deflector 33 may be moved by an actuator 35.

The actuator 35 may be an electric motor and a track as pictured in FIG. 3B. The electric motor drives against the track to cause movement of the airflow deflector 33. The actuator 35 may be a linear actuator. The actuator 35 is connected to a control unit 32. The control unit 32 provides control signals to the actuator 35 to control the movement of the airflow deflector 33 between the two configurations. As discussed in relation to the actuator 31 for the restriction 30, the control unit 32 may be a discrete device or may be part of a more general vehicle control unit. There may be a separate control unit for each of actuators 31 and 35.

The actuator 35 may be an electric motor and a linkage mechanism. The linkage mechanism, when driven by the motor, may cause the airflow deflector 33 to move between the raised and lowered configurations. The linkage mechanism may be a four-bar link which is configured to provide a force along the movement direction of the airflow deflector 33 to the airflow deflector 33. The electric motor is attached to one link of the four-bar link to move the linkage mechanism to provide the force to the airflow deflector 33.

The actions of the airflow through the duct 20 and the airflow deflector 33 on rearwardly moving airflow are complimentary. Therefore, the opening of the duct 20 and the raising of the airflow deflector 33 can be coordinated by the control unit 32. The control unit 32 may cause the restriction 30 to move to the first position and the airflow deflector 33 to move to the raised configuration when the control unit 32 receives a control signal indicating that airflow disruption for the occupant compartment 4 is required. The control unit 32 may cause the restriction 30 to move to the second position and the airflow deflector 33 to move to the lowered configuration when the control unit 32 receives a control signal indicating that airflow disruption for the occupant compartment 4 is not required. The control signal may be provided by a button 36 in the occupant compartment 4. The button 36 may be positioned so that it can be controlled by the driver of the vehicle 1. The button 36 may be a physical control or may be a control integrated into the vehicle user interface, such as a touch screen. The control signal may be the current speed of the vehicle 1. The control unit 32 may cause the restriction 30 to move to the restrictions 30 to move to the first position and the airflow deflector 33 to move to the raised configuration when the control unit 32 receives a control signal indicating that the current speed of the vehicle 1 is at or above a first predefined speed. The control unit 32 may cause the restriction to move to the second position and the airflow deflector 33 to move to the lowered configuration when the control unit 32 receives a control signal indicating that the current speed of the vehicle 1 is at or below a second predefined speed. The first and second predefined speeds may be the same. However, advantageously the first and second predefined speeds may be different by a small amount so that the restriction 30 and airflow deflector 33 do not continually switch between their two states when the car is driven around the first predefined speed. Alternatively, the control unit may cause the restriction 30 and airflow deflector 33 in response to the current speed being to one side of the predefined speeds for longer than a predefined time delay. In the case that one the restriction 30 is present and not the airflow deflector 33 then the control unit 32 may control only the restriction 30 in the manner described above with reference to both the restriction 30 and the airflow deflector 33.

The first predefined speed may be 25 mph, 30 mph, 35 mph, 40 mph or 45 mph. The second predefined speed may be 25 mph, 30 mph, 35 mph, 40 mph or 45 mph. The first and second predefined speeds may differ by 1 mph, 2 mph, 3 mph, 4 mph or 5 mph. The predefined time delay may be 5 seconds, 10 seconds or 15 seconds.

As shown in FIGS. 1 and 4 to 6, the outlet 22 comprises vanes that assist in directing the flow of air exiting the outlet. The outlet comprises two sets of vanes 40, 41.

Figure 6:
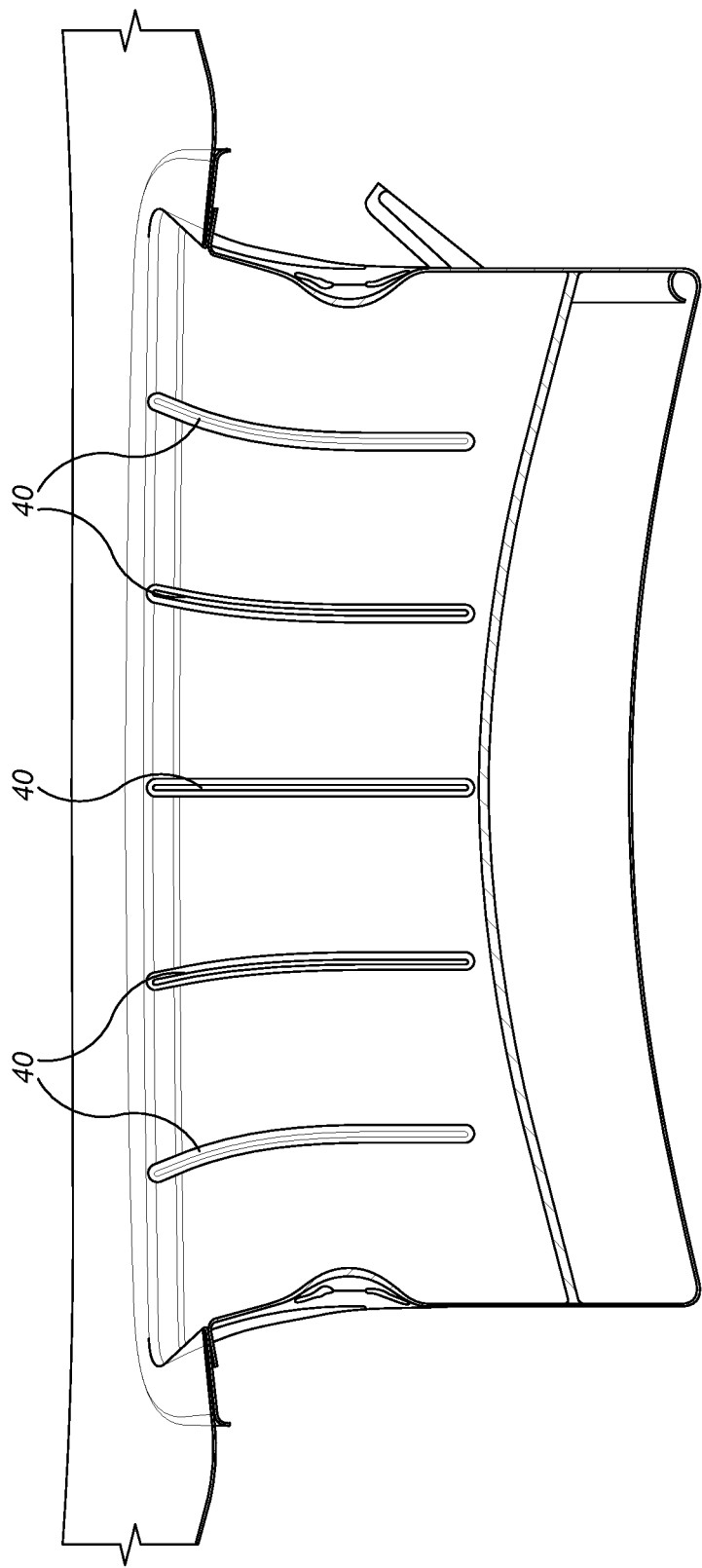
FIG. 6 shows a schematic cut through view of the outlet of the airflow redirection device.

A first set of vanes 40 runs along the width of the outlet 22. These vanes 40 are spaced from each other along the length of the outlet. The distance between each of the vanes 40 at the outer edge of the outlet 22 is generally the same. However, as pictured in FIG. 6, the vanes to either side of a central vane curve outwards along their length from being positioned inside the duct 20 to the edge of the outlet 22 exposed to the top surface 11 of the nose region 10. In this way, the first set of vanes are oriented to spread the upwards airflow in the lateral direction of the vehicle. The first set of vanes spread the upwards airflow along the direction of the length of the outlet 22. This can be advantageous because in most vehicles the nose region 10 has a width that is less than the width of the occupant compartment 4. Therefore, for the outlet 22 to disrupt the airflow in regions outside of its width it needs to project the air emerging from the outlet 22 outwards towards the side edges of the vehicle 1. The first set of vanes 40 may comprise any number of vanes. Preferably, the first set of vanes 40 comprises three vanes, four vanes, five vanes, six vanes or seven vanes. The first set of vanes 40 may comprise five vanes as pictured in FIGS. 1 and 4 to 6. An equal number of vanes may be positioned to each side of a central vane. In the case of five vanes 40, two vanes may be to each side of a central vane. FIG. 6 shows a cut through view of the outlet 22 to show the configuration of the first set of vanes 40.

A second set of vanes 41 runs along the length of the outlet 22. The second set of vanes 41 may comprise any number of vanes. In the case of the configuration shown in FIGS. 1 and 4 to 6 there is only one central vane in the outlet 22. However, there may be multiple vanes 41 spaced from each other along the width of the outlet. In this case, the distance between each of the vanes 41 may be generally the same. Preferably, the second set of vanes 41 may comprise two vanes, three vanes or four vanes. Advantageously, the second set of vanes 41 comprises two vanes. As shown in FIG. 5, the vane(s) 41 are curved to match the curved profile of the duct 20. In this way, the second set of vanes are oriented to direct air flowing through the outlet in an upwards direction and away from the passenger compartment. As pictured in FIG. 5, the second set of vanes 41 project further into the duct 20 than the first set of vanes 40. Alternatively, the second set of vanes 41 may project the same distance into the duct 20 as the first set of vanes 40 or the first set of vanes 40 may project further into the duct 20 than the second set of vanes 41.

The vehicle 1 may comprise a stub-windscreen. The stub-windscreen may be a projection from the vehicle body 6 in front of the occupant compartment 4. The stub-windscreen may project only a short distance from the vehicle body 6, less than a normal windscreen. The stub-windscreen may project from the vehicle body 6 by a distance less than that needed to cover the face of a normal sized occupant in the occupant compartment. The stub-windscreen may also cause a rearwardly moving airflow to be directed over the occupant cabin, again disrupting the rearward flow of air over the middle of the vehicle 1. Alternatively, as pictured in the figures, the passenger compartment may have no front windscreen.

Figure 7:
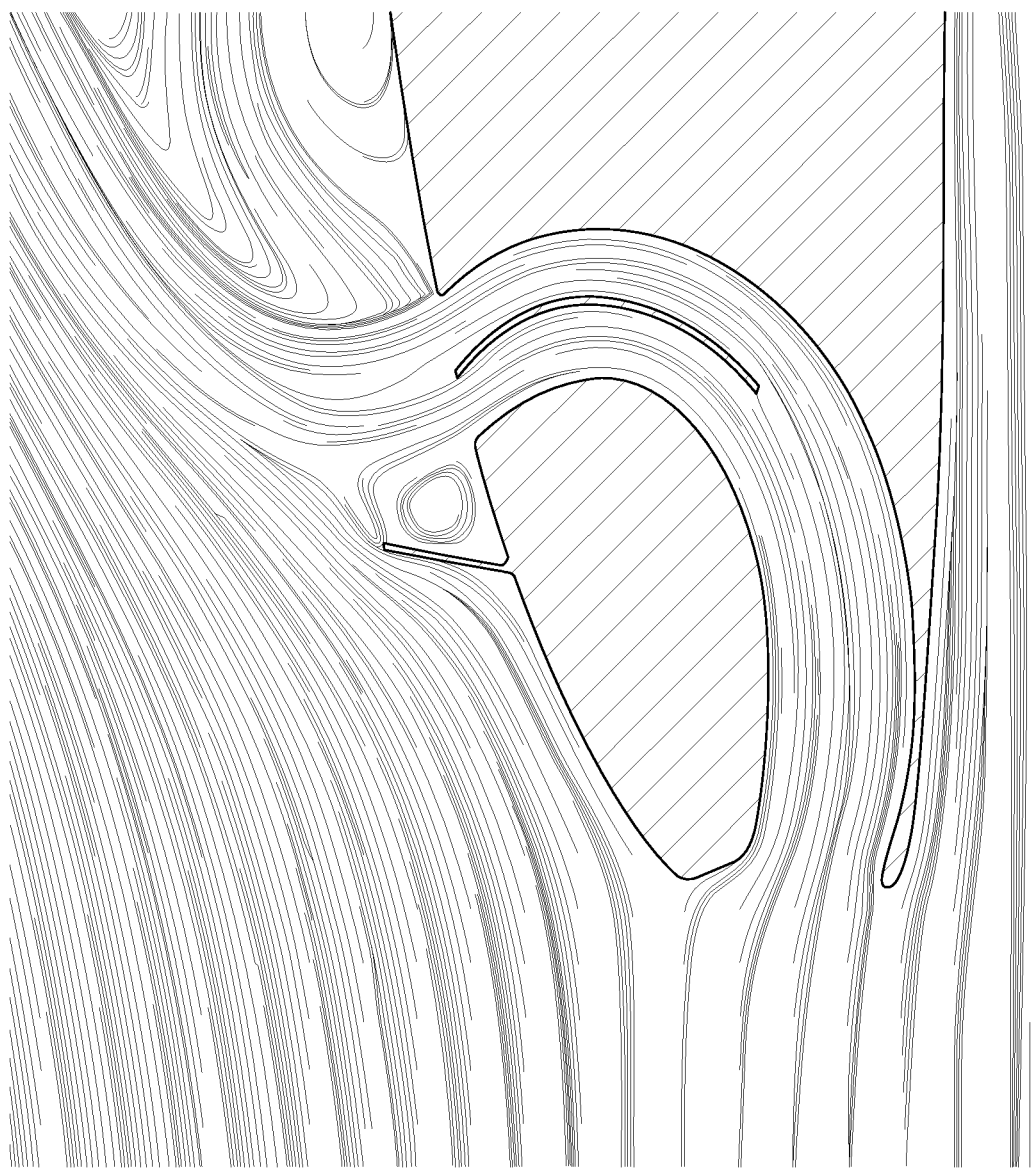
FIG. 7 shows an illustration of the effect of the vehicle on a rearwardly moving airflow when the airflow redirection device and the airflow deflector are in use.
Figure 8:
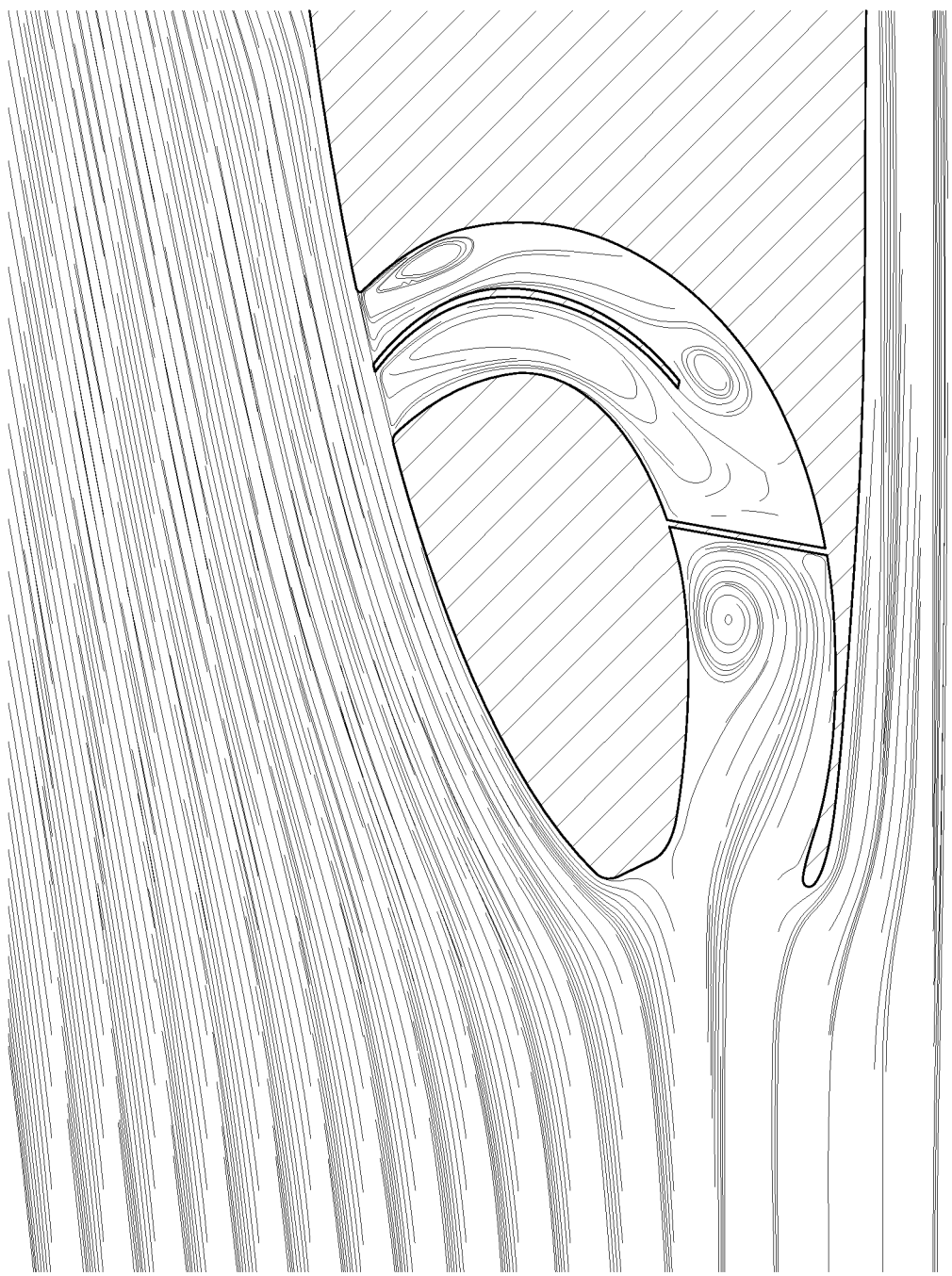
FIG. 8 shows an illustration of the effect of the vehicle on a rearwardly moving airflow when the airflow redirection device and the airflow deflector are not use.

The effect of the airflow redirection device 12 and the airflow deflector 33 can be seen in FIGS. 7 and 8. FIG. 7 shows that the upward airflow generated by the airflow redirection device 12 and the airflow deflector 33 causes the rearward airflow incident on the vehicle 1 to be pushed upwards and go on to flow over the occupant compartment 4. This means that the airflow is disrupted in the region of the occupant compartment 4. Therefore, rather than being subjected to the full force of that rearward airflow only a proportion of it reaches the occupant compartment 4. The restriction 30 is not shown in FIG. 7. FIG. 8 shows the rear airflow when the airflow redirection device 12 and the airflow deflector 33 are both inactive. The rearward airflow can now go on to fully impinge on the occupant compartment meaning that helmets may be required.

The vehicle 1 may comprise an internal combustion engine, shown generally at 13 below the illustrated vents. The system for redirecting airflow may be particularly advantageous on a mid-engined or rear-engined vehicle. Thus, the vehicle 1 may be a mid-engined or rear-engined vehicle. This is because it means that the nose region can be free from engine related components or alternatively at least free from any large engine related components such as radiators. Being free from these engine related components means that there is space for the airflow redirection device 12 herein described. The vehicle 1 may be a hybrid vehicle and so comprise at least one electric motor providing motive power to the vehicle together with an internal combustion engine. The vehicle 1 may be an electric vehicle and so derive motive power solely from electric motors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   a passenger compartment;
   a nose region forwards of the passenger compartment, the nose region having a top surface and a front; and
   a duct running from an inlet to an outlet to permit air flowing into the inlet to be channeled to the outlet, the inlet being positioned at the front of the nose region below the top surface and the outlet being positioned on the top surface of the nose region behind the inlet, the outlet being oriented so that air flowing through the outlet is directed in an upwards direction and directed towards the front of the nose region, the upwards airflow causing disruption to a rearward airflow moving towards the passenger compartment, wherein the outlet comprises a first set of vanes running widthways across the outlet, where the vanes to either side of a central vane curve outwards along their length from being positioned inside the duct to an edge of the outlet exposed to the top surface of the nose region and wherein the first set of vanes are oriented to spread the upwards airflow in a lateral direction of the vehicle.

2. A vehicle according to claim 1, wherein the inlet is positioned behind a leading edge of the front of the nose region.

3. A vehicle according to claim 1, wherein the nose region has an underside and the inlet is positioned at the underside of the nose region.

4. A vehicle according to claim 3, wherein the inlet is positioned between the underside of the nose region and a running surface on which the vehicle sits.

5. A vehicle according to claim 1, wherein the inlet is oriented to channel a rearwardly moving airflow into the duct.

6. A vehicle according to claim 1, wherein the outlet is oriented so that air flowing through the outlet is directed away from the passenger compartment.

7. A vehicle according to claim 1, wherein the outlet is arcuate in shape running across the nose region.

8. A vehicle according to claim 1, the outlet comprising a second set of vanes running lengthways across the outlet.

9. A vehicle according to claim 8, wherein the second set of vanes are oriented to direct air flowing through the outlet in an upwards direction and away from the passenger compartment.

10. A vehicle according to claim 1, the duct comprising a restriction moveable from a first position in which airflow through the duct is substantially unimpeded to a second position in which airflow through the duct is substantially impeded.

11. A vehicle according to claim 1, the vehicle comprising an airflow deflector positioned forward of the outlet, the airflow deflector projecting from the top surface of the nose region to direct a rearwardly moving airflow over the top surface of the nose region in an upwards direction to cause disruption to the rearward airflow moving towards the passenger compartment, the airflow deflector being spaced from the outlet.

12. A vehicle according to claim 11, wherein the airflow deflector is moveable between a lowered configuration and a raised configuration, the airflow deflector projecting minimally from the top surface of the nose region when in the lowered configuration and the airflow deflector projecting maximally from the top surface of the nose region when in the raised configuration.

13. A vehicle according to claim 11, wherein the airflow deflector is housed completely within the nose region when in the lowered configuration.

14. A vehicle according to claim 11, wherein the airflow deflector is moveable between the lowered configuration and the raised configuration along a width of the airflow deflector.

15. A vehicle according to claim 11, the duct comprising a restriction moveable from a first position in which airflow through the duct is substantially unimpeded to a second position in which airflow through the duct is substantially impeded and the vehicle comprising a control unit configured to cause the restriction to move to the first position and the airflow deflector to move to the raised position in response to a control signal indicating that airflow disruption for the passenger compartment is required, and configured to cause the restriction to move to the second position and the airflow deflector to move to the lowered position in response to a control signal indicating that airflow disruption for the passenger compartment is not required.

16. A vehicle according to claim 1, the vehicle comprising a stub-windscreen in front of the passenger compartment.

17. A vehicle according to claim 1, wherein the vehicle has no front windscreen.

18. A vehicle according to claim 1, wherein the vehicle has an underside and the inlet is positioned towards the underside of the vehicle.

19. A vehicle according to claim 1, wherein the outlet is oriented so that air flowing through the outlet is directed in both an upwards and forward direction in equal magnitude.

20. A vehicle according to claim 1, wherein the duct has a length running between the inlet and the outlet, the duct is curved along the length of the duct and the duct has a decreasing radius of curvature as the duct runs from the inlet to the outlet.

\* \* \* \* \*